United States Patent [19]

McCormick et al.

[11] Patent Number: 5,685,555
[45] Date of Patent: Nov. 11, 1997

[54] LIFT TRUCK WITH INERTIAL DAMPER

[75] Inventors: Edward Joseph McCormick; Eric Douglas Springston, both of Greene; Robert J. Lewis, Binghamton, all of N.Y.

[73] Assignee: The Raymond Corporation, Greene, N.Y.

[21] Appl. No.: 391,664

[22] Filed: Feb. 21, 1995

[51] Int. Cl.[6] ............................................ F16F 9/18
[52] U.S. Cl. .................... 280/688; 267/196; 414/631
[58] Field of Search ............................. 280/688, 715, 280/716; 267/196, 202, 203, 214; 188/83, 129; 414/631

[56] References Cited

U.S. PATENT DOCUMENTS

| | | |
|---|---|---|
| 921,471 | 5/1909 | Shilling ........................... 267/214 |
| 1,581,489 | 4/1926 | McKaig ........................... 267/214 |
| 2,564,002 | 8/1951 | Gibson ........................... 180/253 |
| 2,701,629 | 2/1955 | Cairnes et al. ................. 188/129 |
| 2,749,113 | 6/1956 | Kowalik .......................... 267/203 |
| 2,793,029 | 5/1957 | Shafer ............................ 267/211 |
| 3,161,420 | 12/1964 | Rix . |
| 3,218,053 | 11/1965 | Shreve . |
| 3,392,797 | 7/1968 | Gibson et al. ................... 280/688 |
| 3,580,593 | 5/1971 | Spruager . |
| 3,630,317 | 12/1971 | Jacobson . |
| 3,690,413 | 9/1972 | Airheart .......................... 188/381 |
| 3,883,153 | 5/1975 | Singh et al. ..................... 280/688 |
| 3,957,318 | 5/1976 | Wiebe . |
| 4,099,733 | 7/1978 | Ahomen . |
| 4,463,832 | 8/1984 | Bens, Jr. . |
| 4,496,031 | 1/1985 | Allen et al. . |
| 4,621,831 | 11/1986 | Takadera et al. . |
| 4,664,408 | 5/1987 | Saotome et al. . |
| 4,813,512 | 3/1989 | McCormick . |
| 4,854,766 | 8/1989 | Hein . |
| 4,999,902 | 3/1991 | Schumacher et al. . |
| 5,040,823 | 8/1991 | Lund . |
| 5,158,269 | 10/1992 | Hein et al. . |
| 5,219,181 | 6/1993 | Lund . |
| 5,224,790 | 7/1993 | Hein . |
| 5,224,815 | 7/1993 | Abels et al. . |
| 5,322,318 | 6/1994 | Kimura et al. . |

*Primary Examiner*—Paul N. Dickson
*Attorney, Agent, or Firm*—Quarles & Brady

[57] ABSTRACT

A lift truck 100 has an inertial damper 150 coupled between the base frame 116 and a A-frame holding a suspended wheel. The damper has a slider plate 170 frictionally engaged by friction pads 161, 169 on outer plate 160 and friction pads 181, 189 on the other outer plate 180. The outer plates 160, 180 are spring biased against slider plate 170 by belville washers 162, 182 or a coil spring 210.

3 Claims, 8 Drawing Sheets

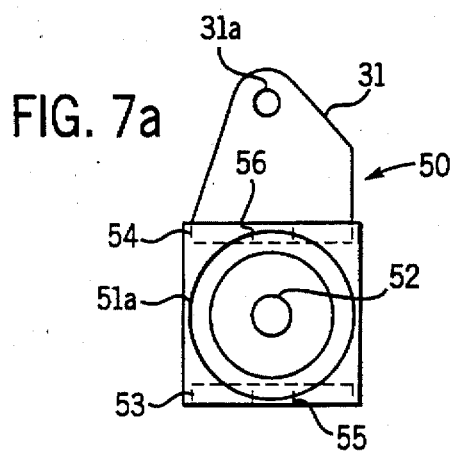
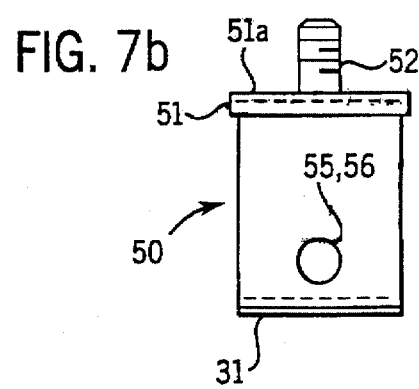
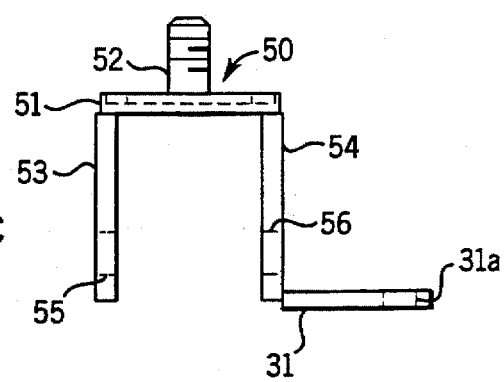
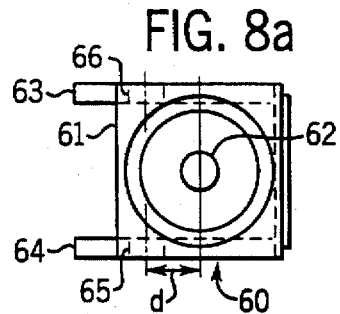
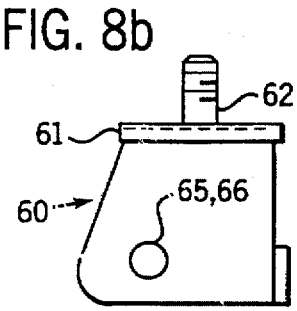
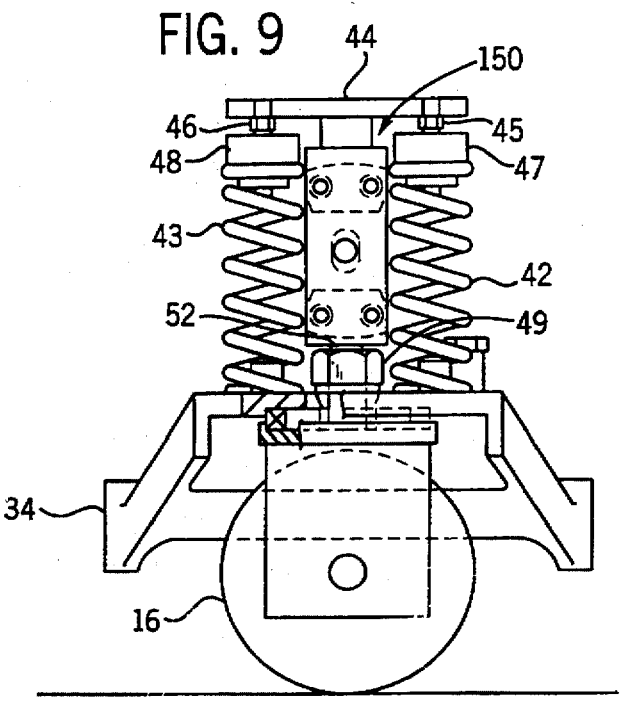

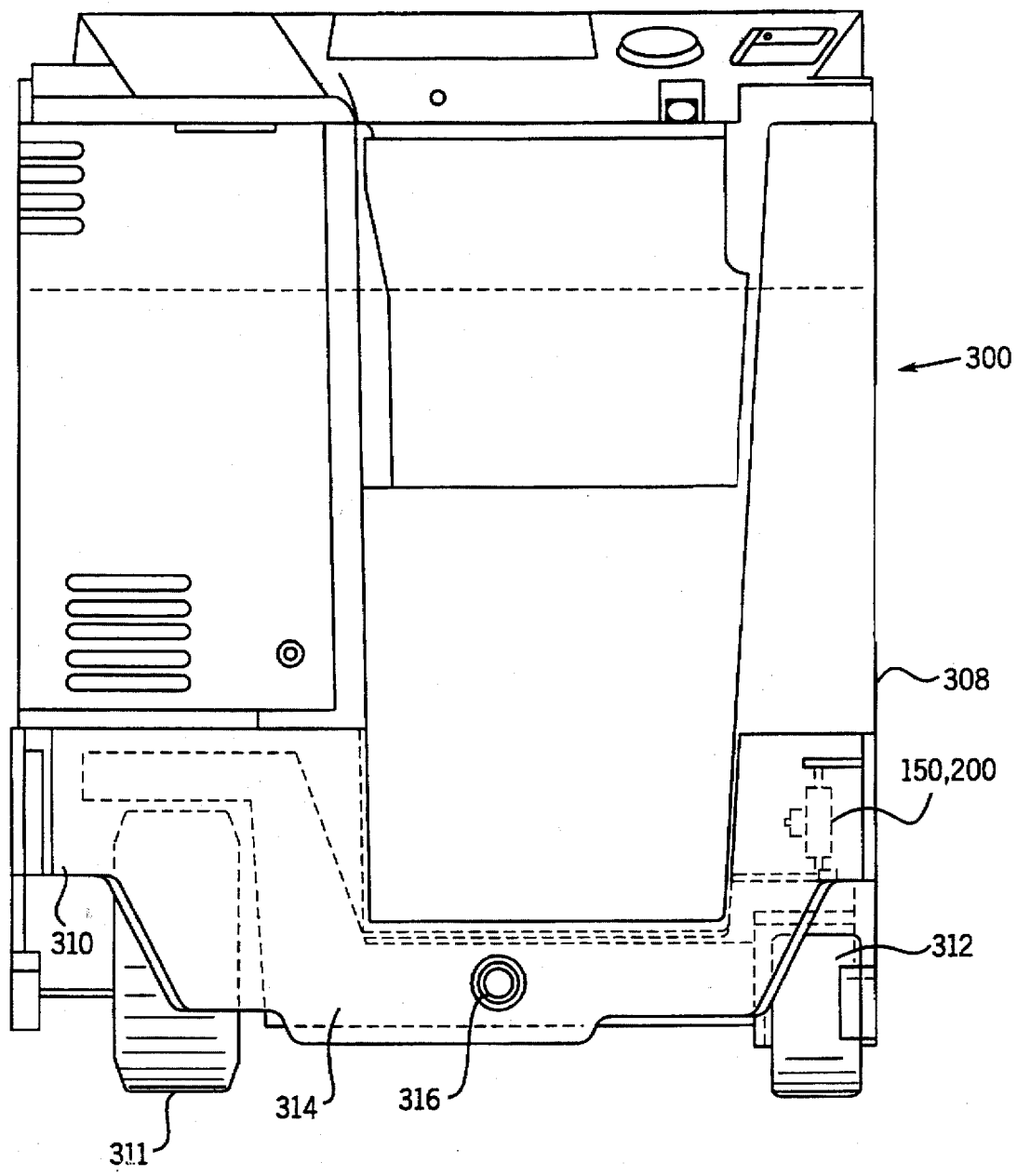

5,685,555

LIFT TRUCK WITH INERTIAL DAMPER

BACKGROUND

This invention relates to material handling apparatus, and more particularly, to improved arrangements for inertially damping the motion of the unpowered, suspended rear wheel commonly used on narrow-aisle lift trucks. One class of narrow-aisle lift trucks employs a pair of unpowered non-steerable front wheels, or load wheels, a steerable powered drive wheel assembly rigidly mounted near one rear corner of the truck, and an unpowered vertically-sprung idler wheel assembly near the other rear corner of the truck. With all four wheels mounted on the same base frame, one wheel must be vertically sprung, or otherwise floor irregularities could result in loss of traction by the drive wheel. In some applications the vertically-sprung idler wheel assembly uses a castered idler wheel which is self-steering. One early form of truck of that type is shown in U.S. Pat. No. 2,564,002. In various other applications the sprung idler wheel is not castered, but instead steered via a linkage. A truck of this latter type is shown in U.S. Pat. No. 3,392,797.

The suspended wheel is suspended from the frame of the truck by coil springs, a torsion bar of leaf springs as shown and described in U.S. Pat. No. 4,813,512, assigned to the assignee of this patent and incorporated herein by reference. Lift trucks achieve significant economies when vehicle frames of a uniform type are used with either a castered idler wheel or a linkage-steered idler wheel. Provision of an idler wheel mounting arrangement which will readily accommodate either type of steering is disclosed in U.S. Pat. No. 3,392,797. In the idler wheel mounting arrangements disclosed in that patent, the pivot steering axis of the idler wheel is located somewhat inwardly from a lateral extremity of the truck to allow space for a castered wheel to swing. The springs used to oppose weight on the idler wheel must be aligned with the pivot or steering axis, so that they do not impose moments which would cause undue bearing wear, and hence the springs also must be located undesirably inwardly from the lateral extremity of the truck, where they tend to interfere with provisions of an unobstructed operator compartment and waste space.

One problem with prior art lift trucks is that they tilt when the truck stops abruptly or abruptly changes direction or both. While such motion will not tip the truck, it is disconcerting to an operator. Normally an operator will slow down and allow the tilt to naturally dissipate before resuming travel. Accordingly, such unwanted tiring reduces the efficiency of the operator and the overall productivity of lift truck operations.

A principal object of the present invention is to provide a suspended idler wheel mounting arrangement wherein the suspension means has its motion dampened in order to limit the tilt of a lift truck following an abrupt stop or an abrupt change in direction.

BRIEF DESCRIPTION OF THE DRAWINGS

FIGS. 7a, 7b, and 7c are top, side and end views, respectively, of a wheel-mounting member used to install a linkage-steered idler wheel.

FIGS. 8a and 8b are top and side views, respectively, of a wheel-mounting member used to install a self-steered castered idler wheel.

FIG. 9 is a view taken at lines 9—9 in FIG. 2, with certain parts omitted for sake of clarity.

FIG. 12 is a rear elevation of another type of lift truck suspension that will benefit from this invention.

DETAILED DESCRIPTION

Figure 1:
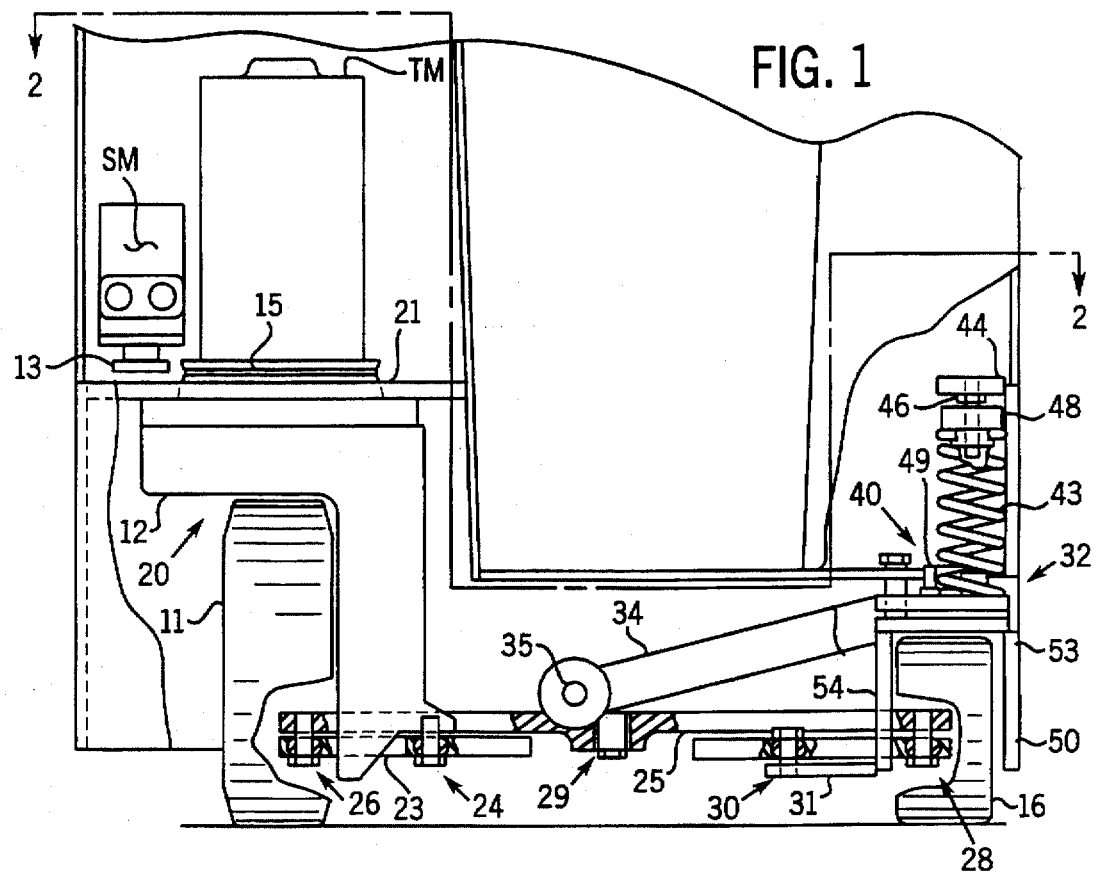
FIG. 1 a rear elevation view of one form of lift truck incorporating a preferred form of the invention, with certain parts cut away and certain parts omitted for sake of clarity.
Figure 2:
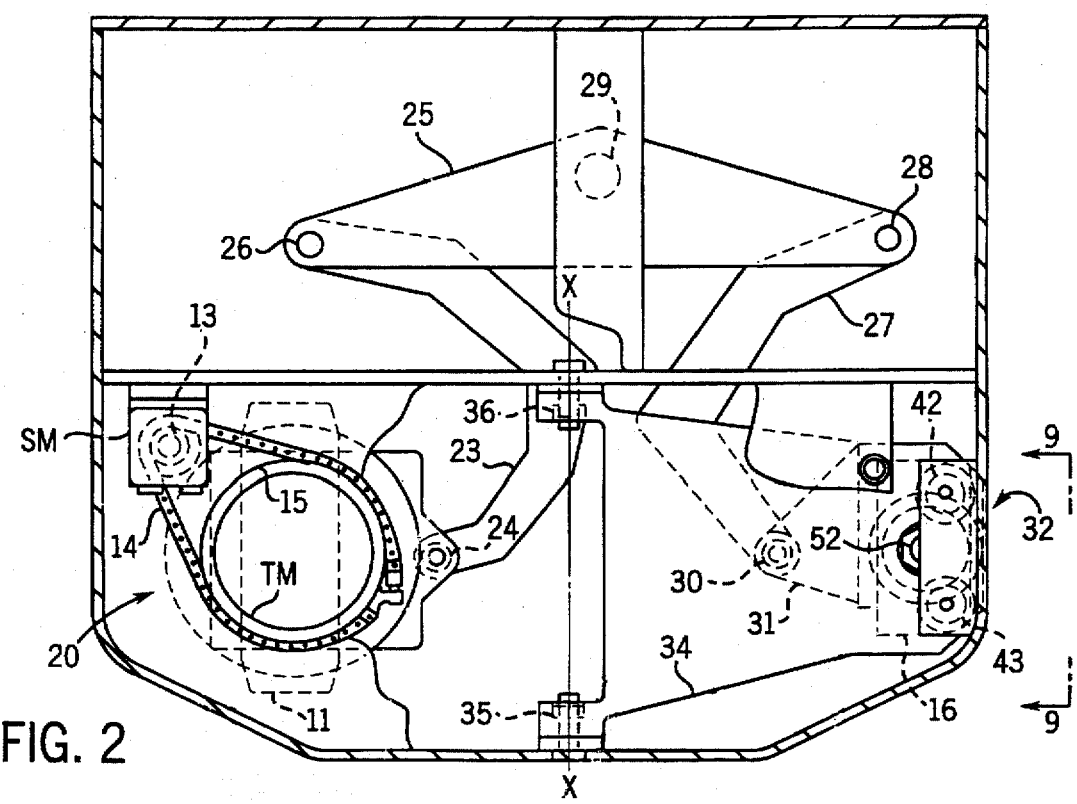
FIG. 2 is a downward section view taken at lines 2—2 in FIG. 1.

FIGS. 1 and 2 illustrate a truck 100 with a steering linkage shown connected to steer the suspended idler wheel. The left side of the rear of the truck is shown supported by a steerable powered drive wheel assembly 20 which is rotatably mounted on plate 21 (FIG. 1) rigidly affixed relative to the base frame 116 of the truck 100. The drive wheel assembly includes an electric traction motor TM which drives drive wheel 11 through reduction gearing 12. A rotary hydraulic steering motor SM is fixedly mounted relative to the base frame 116 of the truck 100 and is operated by a conventional operator control (not shown) in which an operator-controlled steering wheel positions a follower valve, causing rotation of steering motor SM in the direction of, and in an amount proportional to, steering wheel rotation. The shaft of motor SM carries a sprocket 13 which is connected via chain 14 (FIG. 2) to a sprocket member 15 formed on drive unit 20. Chain 14 is omitted from FIG. 1 for sake of clarity.

Drive wheel assembly 20 may comprise, for example, a powered steerable wheel unit of the nature shown in U.S. Pat. No. 3,392,797, with a sprocket 15 or gear added to such a unit to allow it to be rotated. One end of a rigid link 23 is pivotally attached to drive unit 20 via spherical bearing 24. The other end of link 23 is pivotally attached to one end of a bell crank or rocker member 25 via spherical bearing 26. A center portion of bell crank 25 is pivotally attached to the base frame 116 of the truck 100 via needle roller bearing 29. As powered drive wheel assembly 20 is rotated counterclockwise (as viewed in FIG. 2) from the position shown, it will be appreciated that link 23 will rotate bell crank 25 clockwise about bearing 29. One end of a link 27 is pivotally attached to bell crank 25 by spherical bearing 28, and the other end of link 27 is pivotally attached by spherical bearing 30 to an arm 31 affixed to a non-castered idler wheel assembly 32. As bell crank 25 rotates clockwise, idler wheel assembly 32 is rotated counter clockwise. The described steering linkage arrangement is not apart o the present invention, but instead, further described and claimed in my copending application Ser. No. 044,356 filed Apr. 30, 1987. It is to be understood that the idler wheel mounting arrangement of the present invention does not require such a steering linkage arrangement, nor indeed any linkage to steer the idler wheel.

Figure 3:
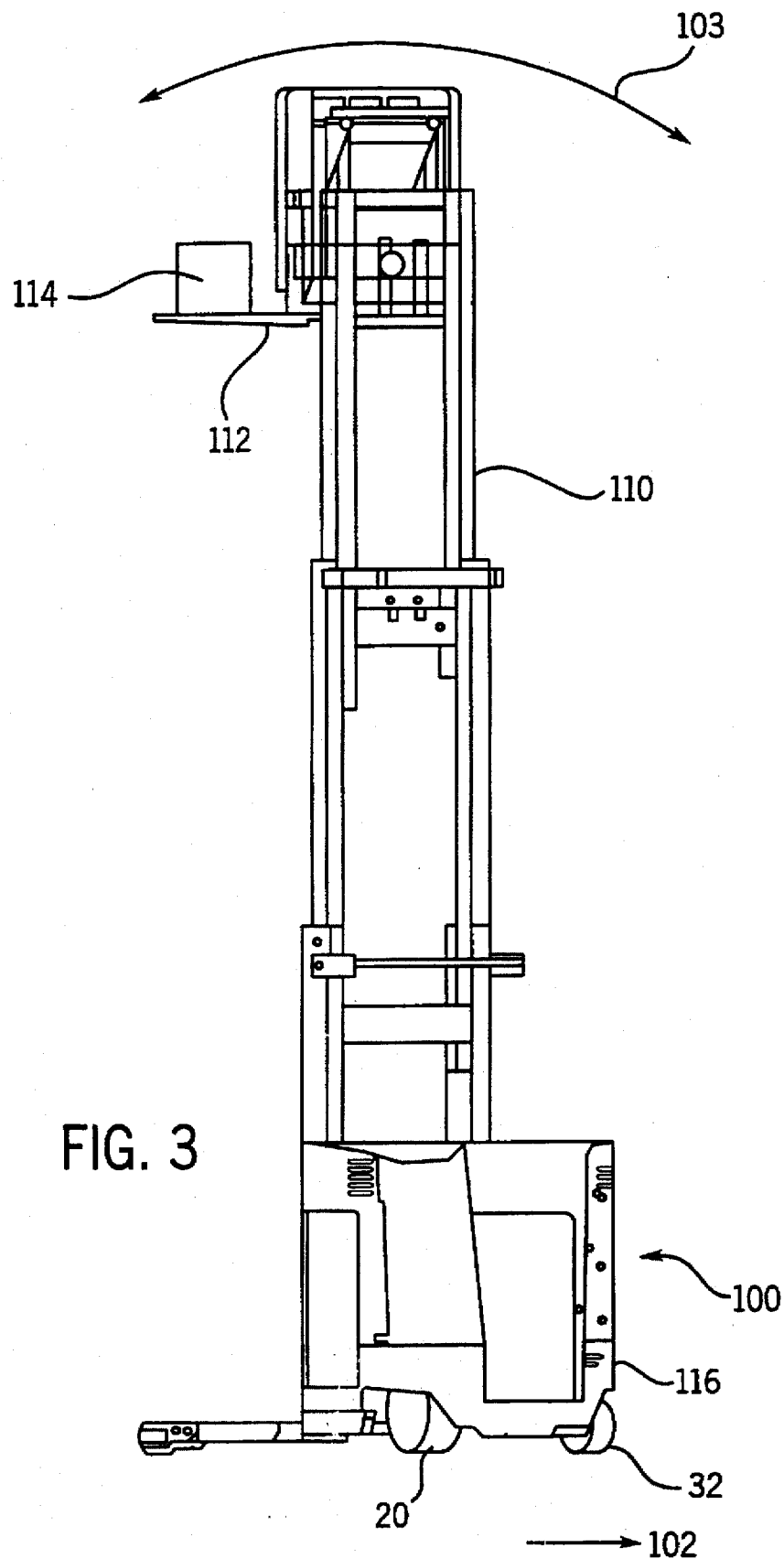
FIG. 3 is an elevation view of a lift truck with its mast extended and supporting a load.
Figure 4:
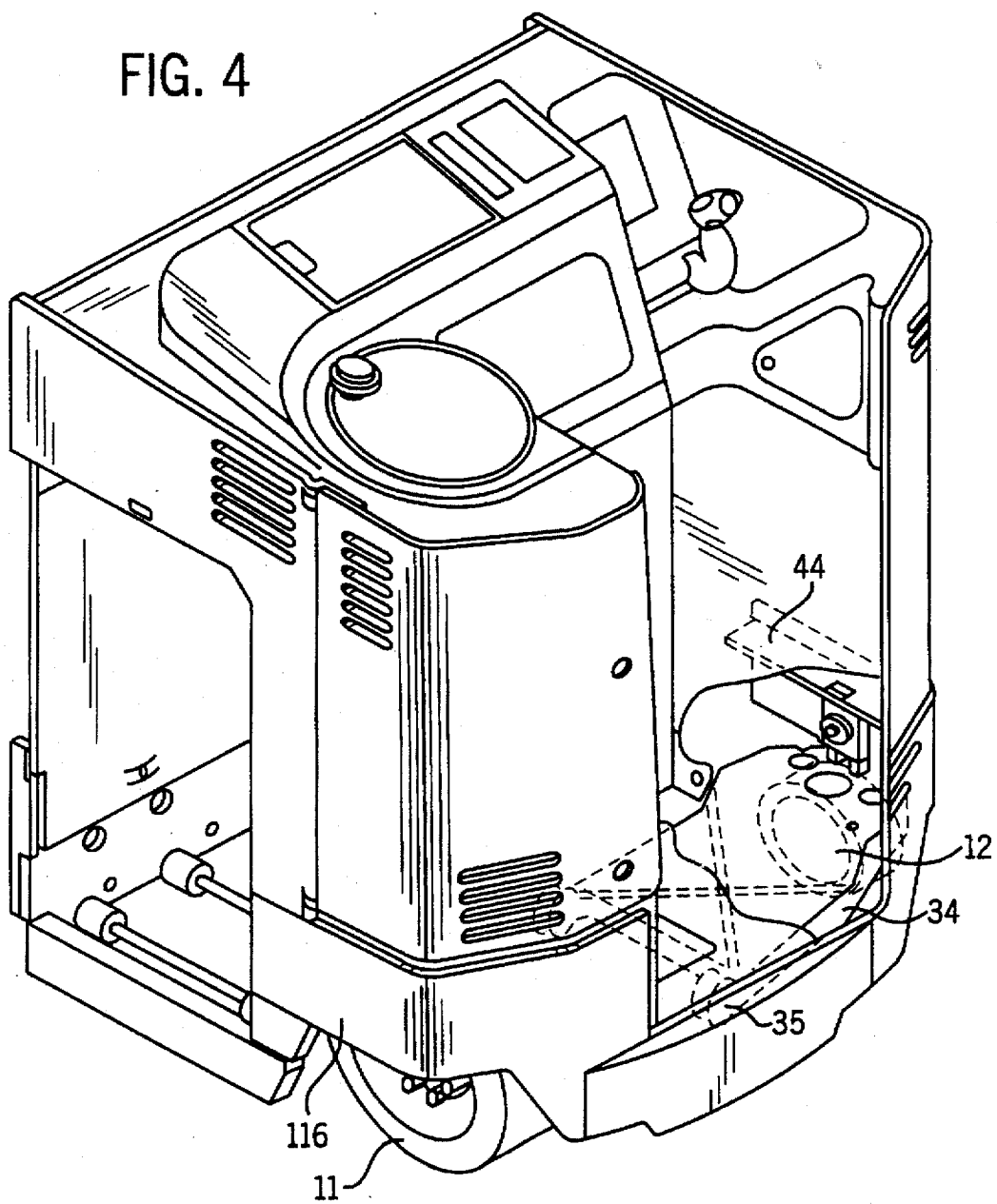
FIG. 4 is a partial perspective and partial cut away view of a lift truck showing an inertial damper on the suspended wheel.

The idler wheel assembly 32 is shown journalled by means of a roller thrust bearing 40 (FIG. 1) near the outer end of a rigid A-flame arm, or lever member 34, which is shown pivotally mounted on the base flame 116 of the truck 100, near the lateral center of the truck 100, by trunnion bearings 35, 36, so that A-frame lever member 34 may rotate limited amounts about a horizontal longitudinally-extending axis x—x (FIG. 2). A pair of compression springs 42, 43 are shown interposed between the outer end of the A-frame lever member and a plate affixed to the base frame 116 of the truck 100. Hence springs 42, 43 compress in accordance with the vertical weight imposed on the idler wheel, and as the truck 100 travels over irregular floor surfaces the idler wheel may move upwardly and downwardly relative to the frame 116 of the truck 100 to insure that adequate weight to provide traction is always imposed on the powered drive wheel 11 of drive unit 20. As shown in FIG. 3, when truck 100 stops abruptly or abruptly changes direction, the springs 42, 43 are compressed and oscillate, thereby causing the mast 110 to tilt oscillate in the direction of arrow 103. Such oscillation is enhanced by a load 114 carried on fork 112 that are extended to the top of the mast 110.

As floor surface irregularities cause the A-frame lever member 34 to rotate about axis x—x, the steering axis of the idler wheel assembly departs slightly from the vertical, and because the idler wheel steering shaft is journalled in lever member 34 for rotation about a fixed axis, the slight rotation of lever member causes floor contact of the idler wheel to vary between the inside and outside edges of the idler wheel tire. Constant running on the inside or outside edge of the idler wheel tire could cause unacceptable wear. However, because A-frame lever member 34 is long, i.e., pivoted a substantial lateral distance from the idler wheel tire, and because the pivot axis x—x of the A-frame lever member is very near the floor, the angular amount by which the idler wheel steering axis departs from the vertical is modest, and because appreciable rotation of lever member 34 occurs only when floor irregularities are encountered, the described arrangement results in acceptably little tire wear.

Idler wheel assembly 32 includes an idler wheel 16 (shown partially cutaway in FIG. 1), and a vertical pivot or steering shaft 52 (FIG. 2). When the idler wheel assembly 32 is to be steered via a linkage, as shown in FIGS. 1 and 2, for example, that assembly utilizes a non-castered wheel mounting member 50 of the nature shown in FIGS. 7a–7c. Alternatively, when the idler wheel is to be self-steering, a wheel mounting member 60 of the type shown in FIGS. 8a and 8b is used in place of member 50.

As seen in FIGS. 7a, 7b, and 7c, a wheel mounting member 50 for mounting a linkage-steered idler wheel comprises an upper plate member 51 carrying an upstanding pivot shaft 52, a pair of depending side plates, 53, 54, and an attachment arm plate 31 to which link 27 (FIG. 1) is pivotally connected at hole 31a. Upper plate member 51 carries an annular groove 51a in which a thrust bearing fits. A pair of holes 55, 56 in side plates 53, 54 accommodate the axle (not shown) of a conventional idler wheel, so that the axis of such an axle lies directly below the idler wheel steering axis (i.e., the axis of shaft 52), as shown in FIG. 7b.

As shown in FIGS. 8a and 8b, the wheel mounting member 60 used for mounting a self-steering caster wheel is formed quite similarly with an upper plate member 61 carrying an upstanding steering shaft 62, and a pair of depending side plates 63, 64, but with arm 31 omitted because no link need be connected. Also, the idler wheel axle holes 65, 66 are offset (by dimension d, FIG. 8b) from the steering axis of shaft 62 to provide a desired amount of castering. From the above it will be seen that the same basic truck 100 can be readily equipped for either linkage steering or caster steering of the sprung idler wheel, by mere selection of which form of wheel mounting member (50 or 60) is used for the idler wheel, and if the castered form of idler wheel is used, links 23 and 27 and crank 25, and their associated bearings are not installed.

A nut 49 is screwed onto the threaded upper portion of shaft 52 or shaft 62. As best seen in FIG. 9, adjustment of springs 42 and 43 is accomplished by rotation of bolts 45, 46. Bolts 45, 46 each have a hexagonal portion which may be readily grasped with a wrench, an upper portion which seats in a respective bore in plate 44, and a lower portion threaded into a respective spring retainer 47, 48, which seats in the top of one of the springs. Damper 150 is disposed between springs 42, 43 with one end of damper 150 coupled to the base frame 116 of truck 100 and the other end of the damper 150 coupled to the A-frame 34.

Figure 5:
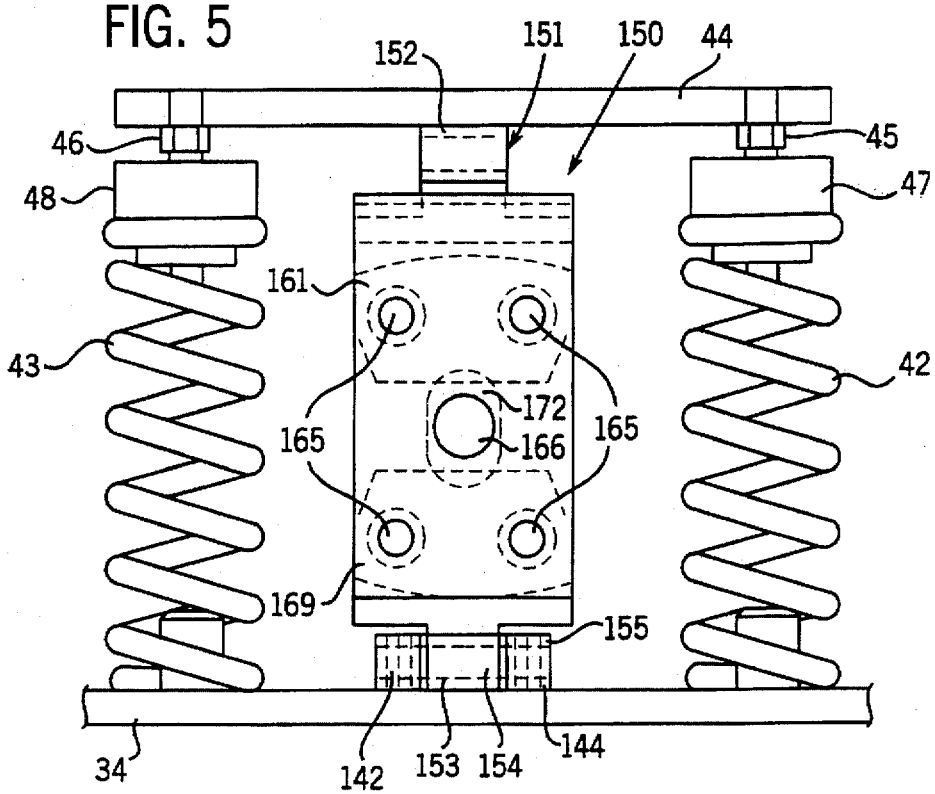
FIG. 5 is an elevation view of the damper mounted between two coil springs.
Figure 6:
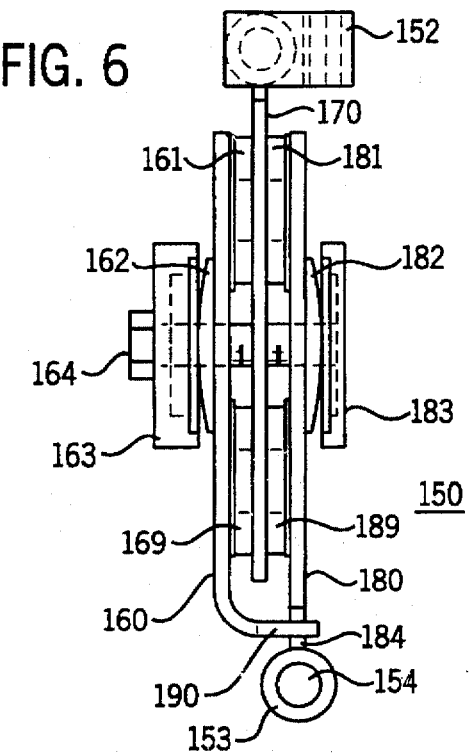
FIG. 6 is an end view of the damper of FIG. 5.

Turning to FIGS. 5 and 6, there is shown one embodiment of the inertial damper 150. An interior slider plate 170 is disposed between outer plates 160, 180. Outer plate 160 has a pair of friction pads 161, 169 mounted on its interface and abutting one face of a slider plate 170. In a similar manner, outer plate 180 has a pair of friction pads 181, 189 mounted on its interface and facing the other face of slider plate 170. As shown in FIG. 5, the upper friction pad 161 of outer plate 160 and the lower friction pad 169 are held on the outer plate 160 with a plurality of rivets 165. A similar riveting arrangement is used to fix the friction pads 181, 189 to outer plate 180. Slider plate 170 has an elliptical opening 172 to allow for vertical motion. Outer plate 160 has an opening 166 that is generally aligned with the elliptical opening 172 of the slider plate 170. Outer plate 180 has a corresponding opening 186, not shown. A pair of belville washers 162, 182 are respectively disposed against the outer faces of the slider plates 160, 180. The belville washers are held in place by respective retainers 163, 183. An adjusting bolt 164 engages the retainers 163, 183 and can be turned to adjust the pressure exerted by the belville washers 162, 182 on the outer plates 160, 180.

The outer plate 160 has a bent portion 190 that fits in a suitable slot 184 of the other outer plate 180. The outer plate 180 has a sleeve 153 with an opening 154. The opening 154 and the sleeve fit between mounting lugs 142, 144. Mounting lugs 142, 144 and sleeve 154 have a common bore. A suitable pin is secured in the bore in order to couple the outer plates 160, 180 to the frame 34 of the suspended wheel 16.

In operation, as the mack 100 moves backward and abruptly stops the mast 110 begins to tilt in the direction indicated by arrow 103 pivots about a line between the drive wheel contact with the floor and the right front load wheel contact with the floor so that the base 116 of the truck 100 compresses the springs 42, 43. Without the inertial damper 150 the truck 100 would oscillate aided by springs 42, 43. The truck would continue to oscillate in this manner until the oscillation is dissipated in friction inherent in the suspension members. This friction is neither sufficient nor predictable enough to effectively control truck sway or oscillation for operator comfort. However, with the inertial damper 150, the slider plate 170 which is coupled to the frame 44 has its motion frictionally retarded by the friction pads 161, 169, 181, and 189 that bear upon the slider plate 170.

Figure 10A:
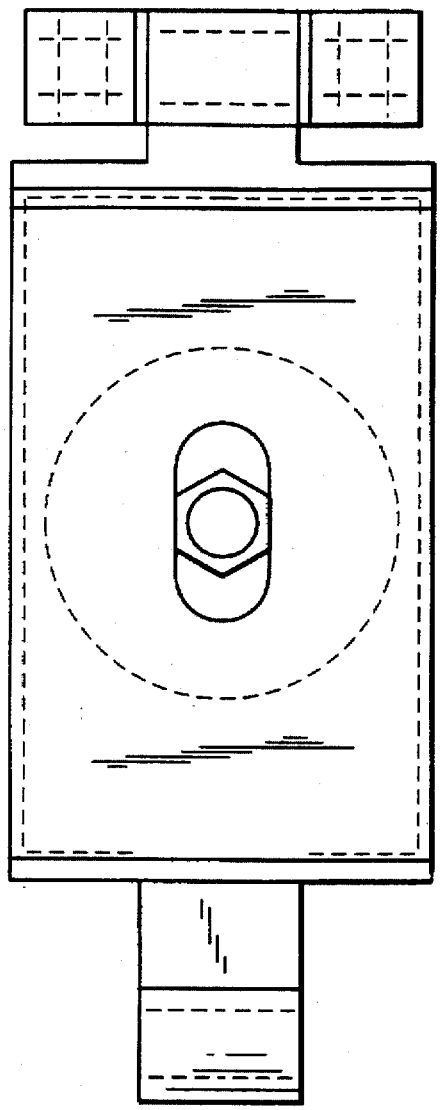
FIG. 10 is an elevation view of a second embodiment.
Figure 10B:
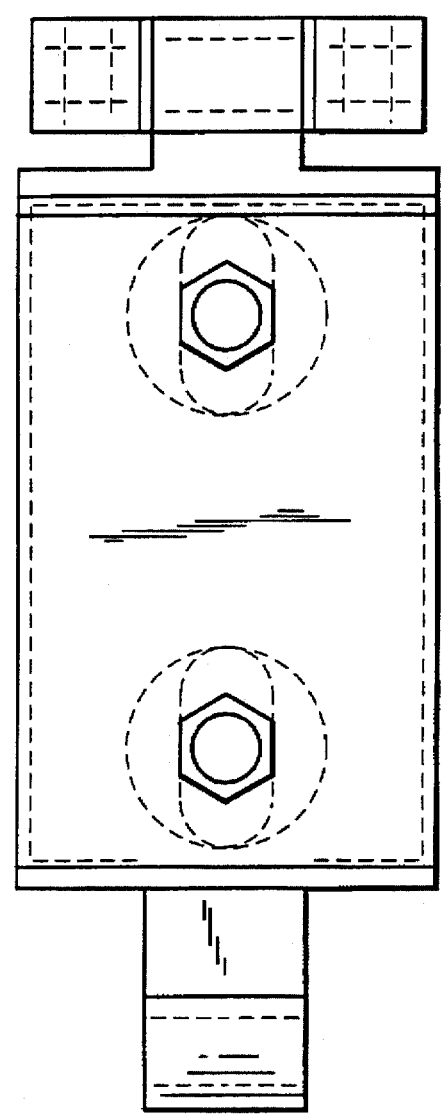
Figure 11A:
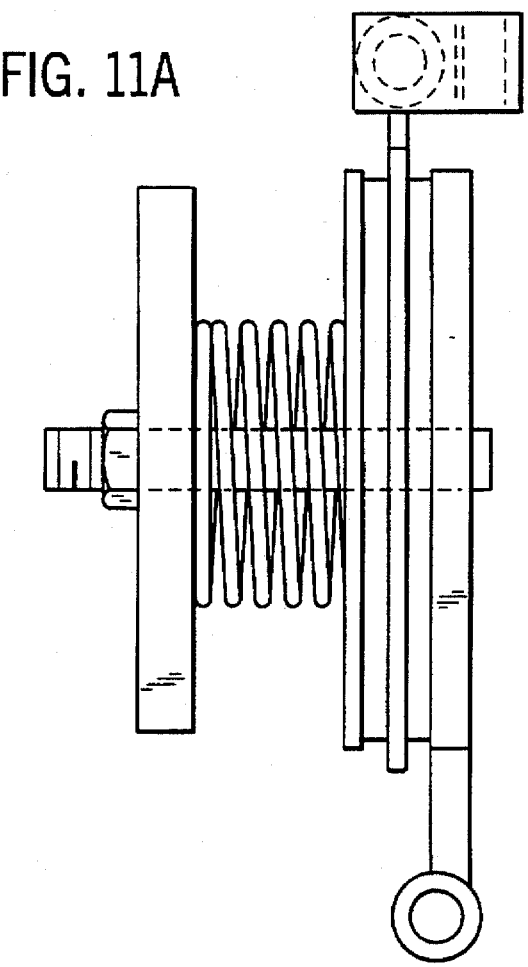
FIG. 11 is an end view of FIG. 10.
Figure 11B:
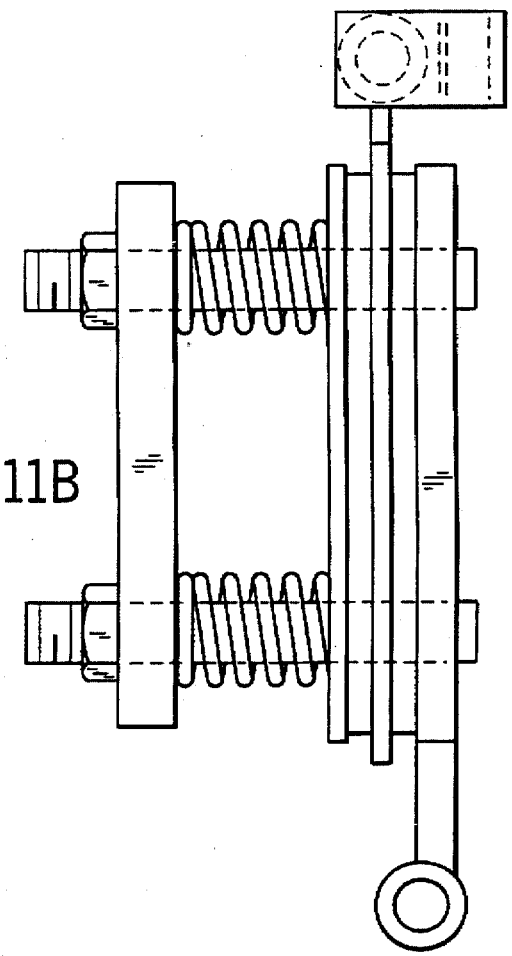

As mentioned above, the amount of damping is adjustable by the amount of tension imposed upon the belville washers 162, 182. That tension is adjustable by adjusting nut 164. Those skilled in the art will appreciate that other biasing members than belville washers may be used to adjust the pressure of the friction pads on the slider plate 170. Accordingly, in the alternate embodiment 200 shown in FIGS. 10, 11, the belville washers are replaced with a compression spring 210. Multiple springs can also be used. The spring 210 is disposed between a compression plate 211 and outer plate 160. A pair of bolts 212, 214 engage threaded holes in plate 180. By turning the bolts 212, 214, the compression plate 211 can be moved toward outer plate 160 to increase frictional force on slider 170 or can be moved in the opposite direction to reduce friction force on the slider plate 170. The length of the compression spring and consequently its force may be suitably adjusted by turning the bolts 212 and 214.

Lift trucks with different suspension types can be aided by this invention. An common example of an other suspension is shown in FIG. 12. In that example, the drive wheel unit 310 and idler wheel 312 are rigidly but rotatebly attached to a common connecting beam 314 running laterally across the truck. The connecting beam is pivotally mounted to the truck chassis by a pivot pin or bolt 316 near the truck center line. The pivot pin or bolt 316 is oriented in a horizontal direction parallel to the truck's fore-aft axis. With this arrangement, either wheel may rise or fall while following floor contours and keep all four of the truck's wheels on the floor. If the idler wheel, for instance, dropped into a depression, the connecting beam would pivot relative to the truck chassis with the drive end of the truck dropping approximately one half of the drop of the idler wheel. Alternatively, the same action would occur if the drive wheel dropped into a depression. The lateral position of the connecting beam pivot pin or bolt 310 relative to the distance between the drive and idler wheels will determine the relative loading on each wheel. Moving the pin 316 closer to the drive wheel will increase the drive wheel loading for increased traction. Conversely, moving the pin closer to the drive tire will decrease the loading on the drive tire for increased drive tire life. Either a steered idler wheel or caster wheel may be used with this arrangement as noted in the earlier case.

The truck 300 is also prone to sway in a manner described earlier. Instead of pivoting on the drive tire 311 and dipping down on the idler wheel 312 due to spring compression as in the earlier version, the truck 300 would pivot instead on the pivot pin in a similar manner. By applying on inertial damper 150 or 200 between the connecting beam 314 and the truck frame 308 as shown in FIG. 12 truck sway or oscillation can be limited.

Having thus described the preferred embodiment of the invention, those skilled in the art will appreciate that further modifications, additions, and changes thereto may be made in the preferred embodiments of the invention without departing from the spirit and scope of the following claims:

What we claim is:

1. A lift truck comprising:

a frame, a motor and wheels mounted on the frame with at least one wheel driven by the motor and another wheel suspended from the frame by a spring, a movable lift mast mounted on the frame for vertically extending and retracting and having a mass sufficient to tip the frame of the truck such that a portion of the frame adjacent the suspended wheel changes its relative position with respect to ground when the truck stops abruptly or changes direction abruptly, an inertial damper coupled between the suspended wheel and the frame, said inertial damper having a pair of parallel outer plates, a slider plate disposed between, parallel to and equidistant from the two outer plates along its entire length, the frame coupled to either the pair of outer plates or the slider plate and the suspended wheel coupled to the other of the pair of outer plates and the slider plate, a pair of friction pads, each friction pad disposed between an outer plate and the slider plate for frictionally engaging the slider plate when the frame moves relative to the wheel and for slowing the relative motion between the frame and the wheel, the inertial damper further comprising an adjustable means for applying a pressure to the outer plates, the adjustable means comprising a pair of belville washers, each belville washer bearing against one of the outer plates, and a retainer passing through the washers and the plates for holding the washers in position, whereby the friction between the friction pads and the slider plate is substantially constant and independent of the relative positions of the slider and outer plates.

2. The lift truck of claim 1 wherein the retaining means comprises a threaded bolt and an adjustable nut for increasing or decreasing the tension on the belville washers.

3. A lift truck comprising:

a frame, a motor and wheels mounted on the frame with at least one wheel driven by the motor and another wheel suspended from the frame by a spring, a movable lift mast mounted on the frame for vertically extending and retracting and having a mass sufficient to tip the frame of the truck such that a portion of the frame adjacent the suspended wheel changes its relative position with respect to ground when the truck stops abruptly or changes direction abruptly, an inertial damper coupled between the suspended wheel and the frame, said inertial damper having a pair of parallel outer plates, a slider plate disposed between, parallel to and equidistant from the two outer plates along its entire length, the frame coupled to either the pair of outer plates or the slider plate and the suspended wheel coupled to the other of the pair of outer plates and the slider plate, a pair of friction pads, each friction pad disposed between an outer plate and the slider plate for frictionally engaging the slider plate when the frame moves relative to the wheel and for slowing the relative motion between the frame and the wheel, the inertial damper further comprising adjustable means for applying a pressure to the outer plates, the adjustable means including an adjustable spring bearing on at least one of the outer plates to adjust the pressure of the outer plates on the slider plate, the adjustable means further including means for adjusting the tension of said spring, whereby the friction between the friction pads and the slider plate is substantially constant and is independent of the relative positions of the slider and outer plates.

* * * * *